Nov. 16, 1926.
M. P. WHIPPLE
1,607,375
LAMINATED MATERIAL, SOLE FOR FOOTWEAR, AND METHOD OF MAKING SAME
Filed July 14, 1924
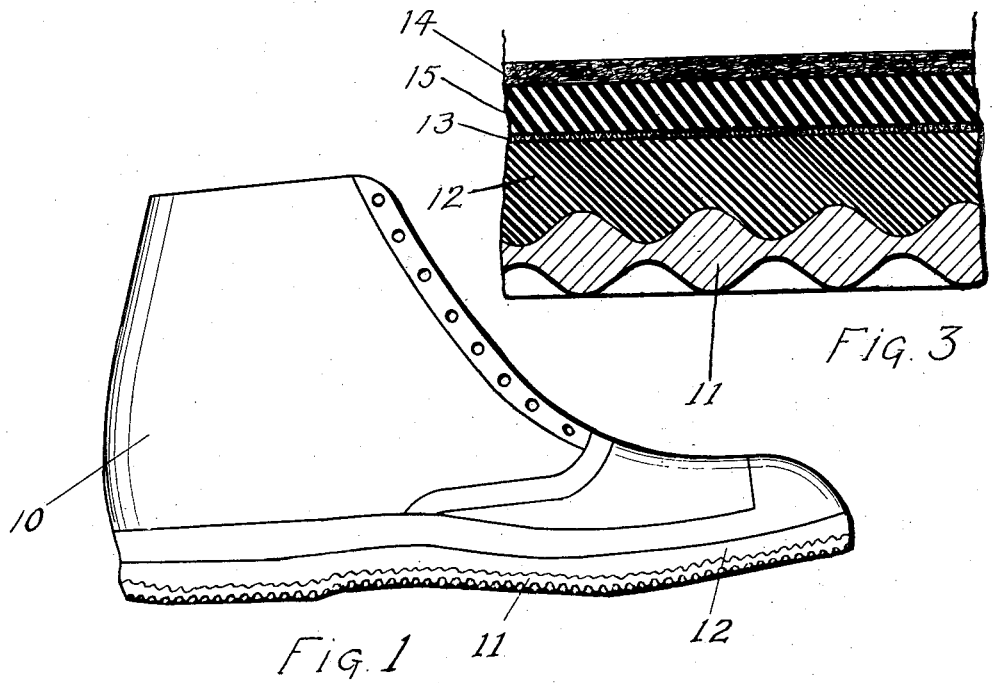
Fig. 3
Fig. 1
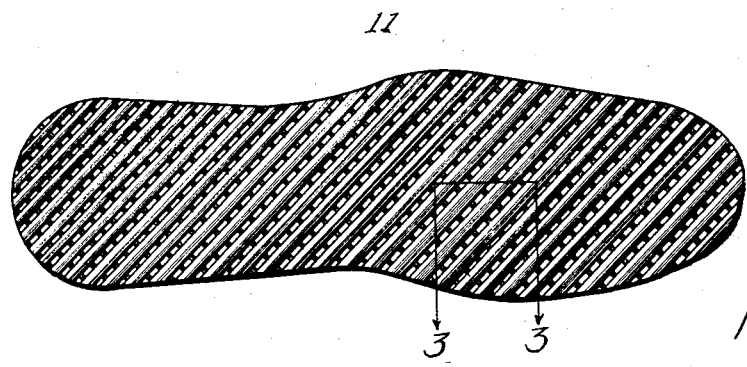
Fig. 2
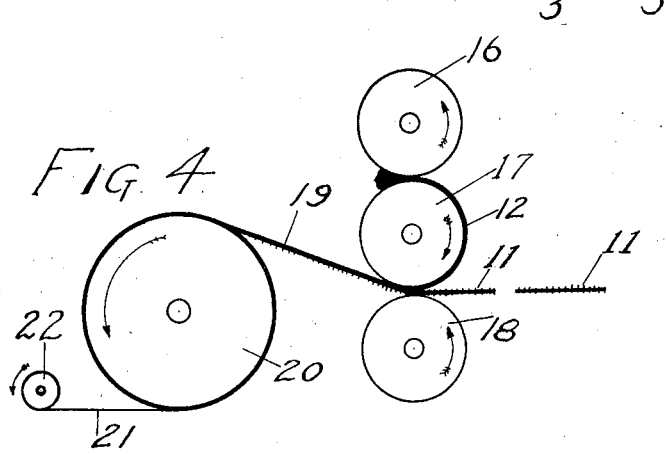
Fig. 4
INVENTOR.
MAHLON P. WHIPPLE
BY 
ATTORNEY.

Patented Nov. 16, 1926.

1,607,375

UNITED STATES PATENT OFFICE.

MAHLON P. WHIPPLE, OF HUDSON, MASSACHUSETTS, ASSIGNOR TO THE FIRESTONE-APSLEY RUBBER COMPANY, OF HUDSON, MASSACHUSETTS, A CORPORATION OF MASSACHUSETTS.

LAMINATED MATERIAL, SOLE FOR FOOTWEAR, AND METHOD OF MAKING SAME.

Application filed July 14, 1924. Serial No. 725,824.

This invention relates to wear-resisting material particularly useful as soles for footwear of rubber, canvas, leather or other material, and to methods of making the same.

The invention has for its chief objects the provision of an improved material, an improved rubber sole especially designed for athletic wear, and a method of making the material. This invention includes in particular, a sole which is substantially of pure gum crepe such as is ordinarily received from the rubber plantations, yet which may be vulcanized onto the upper without destruction of toughness, texture, nerve or fibre of the crepe and without affecting its surface which has most excellent, non-slipping and other qualities in the condition in which it is shipped from the plantation, which qualities are particularly desirable for sole material.

Heretofore, rubber crepe soles have been employed which have been manufactured from the so-called "pale" or cream-colored crepe rubber in the condition in which it is ordinarily received from the plantations. This rubber is produced at the plantation by first coagulating the rubber latex, washing the same, and then working and reworking the rubber between rolls until it takes on the creped appearance from which it derives its name. It has been found that this rubber has been so worked that its natural nerve, fibre or toughness is practically destroyed when subjected to heat of vulcanization. Hence, in its use for soles, it has either been necessary to cement or cold cure the crepe sole onto the upper to avoid destruction of the texture of the crepe under heat vulcanization, or to make an imitation crepe by forming a layer of compounded vulcanizable rubber so as to have an appearance similar to pale crepe. By this latter method, however, the non-slipping qualities of the crude rubber are not obtainable.

It has been discovered that if, instead of using "pale" crepe, what is known in the art as "smoked sheet" be used, an improved sole, heat vulcanized to the upper, can be obtained having all the desirable qualities of the pale crepe sole without danger of separating from the upper, and having the advantage over creped compounded rubber of the better non-slipping qualities of crude rubber.

The method of the invention contemplates the production of a sole from "smoked sheet" by the pressing as by calendering onto one side thereof, of a backing sheet of compounded "cushion" gum of a highly resilient character when vulcanized. Smoked sheet is made at the plantation by rolling out coagulated rubber to sheet form, the rolls being so formed as to give the sheet rubber a peculiar ribbed creped appearance somewhat different from pale crepe. The sheets are formed with much less rolling or working than crepe and the nerve, fibre and toughness of the natural coagulated product is preserved to a great extent since the rubber is not permitted to highly plasticize.

The sheets, thus formed, are then hung in a chamber in which they are smoked for considerable periods of time, the smoking operation being very much similar to the smoking of meats. During this process the rubber absorbs considerable carbon and as a result thereof, it changes from the cream color of natural rubber to a deep, comparatively clear, amber color. The addition of carbon to the rubber has the effect of toughening it considerably so that the smoked sheet, as it comes from the plantation is most excellent material for rubber soles, it being able to withstand the pressing or calendering operation by which the backing of compounded rubber is applied thereto and the subsequent heat vulcanization to the upper, without being substantially affected so far as its physical qualities are concerned. Moreover, it is more resistant to wear than pale crepe rubber.

The invention will be better understood by proceeding with the description thereof in connection with the accompanying drawings in which the material, the sole and the method of making the material are illustrated, it being understood that the invention is not limited to the specific forms thereof shown or described.

Of the accompanying drawings:

Figure 1 is a side elevation of a shoe having a sole thereon constructed in accordance with the invention;

Figure 2 is a plan of a sole;

Figure 3 is an enlarged section through the sole on line 3—3 of Figure 2; and

Figure 4 is a view diagrammatically illustrating the method of making the material.

Referring to the drawings, 10 indicates an athletic shoe of canvas having a sole 11 of smoked sheet secured thereto by a sheet of compounded rubber 12 of such character that it will be highly resilient when vulcanized, the sole being secured to a layer of rubberized fabric 13 which is secured onto the bottom of the upper. A layer of felt 14 may be secured within the bottom of the shoe 10 to the layer of fabric 13 by a layer of compounded rubber 15. The several layers 11, 12, 13, 14 and 15 after vulcanization will be practically inseparable.

In order that the layer of smoked sheet will be securely held to its backing the preferred method of uniting these two lays is to calender the sheet of compounded rubber 12 onto the sheets 11, in the manner illustrated in Figure 4. Highly plasticized compounded stock is banked between oppositely rotating rollers 16 and 17 which form it into a layer on roller 17 in the well known manner, the thickness of the layer being gaged by the distance apart of rollers 16 and 17. Sheets of smoked sheet 11 are fed between the roller 17 and an oppositely rotating roller 18, the distance between these rollers being so adjusted that the layer 12 will be pressed with considerable force into the troughs and depressions in the creped smoked sheets 11 (see Figure 3).

A composite sheet 19 issues from the calender which consists of smoked sheets 11 held together by the backing layer, the rubber of which is, of course, squeezed between the sheets. This stock may be led onto a wind-up roll 20 along with an interliner 21 supplied from a roll 22. The smoked sheets 11 may then be cut from the composite stock 19 together with their backings 12 and the composite sheets are cut out in the ordinary manner to produce soles of the desired shape and size. These are then cemented to the upper, rolled or stitched into place and vulcanized.

In the vulcanization of the sole onto the shoe, migration of sulphur from the layer 12 into the smoked sheet 11 will cause vulcanization of the smoked sheet to some extent, especially in those portions thereof adjacent the layer 12, so that the two layers will be substantially an inseparable, integral whole, the tread surface of the sheet 11 being, however, substantially in its crude or non-vulcanized state.

It is obvious that the process and the material are not limited in use to the production of soles for footwear. The material comprising smoked sheet vulcanized onto a backing of highly resilient rubber is capable of wide use wherever there is desirability of a non-slipping, long-wearing surface, in connection with a highly resilient backing therefor.

It has been found that the union, obtained between the stocks by first pressing hot, plastic rubber onto the smoked sheet and subsequently vulcanizing, is a perfect one which is absolutely incapable of separation during use.

Modifications of the invention other than those described herein may be resorted to without departing from the spirit or scope of the appended claims.

What I claim is:

1. Footwear of the character described, having a sole comprising a tread layer of smoked crepe rubber, and a backing layer of vulcanizable rubber which have been pressed together while the latter was plastic.

2. Composite material comprising a layer of smoked crepe rubber, and a layer of cushion rubber.

3. Composite material comprising a layer of smoked crepe rubber, and a layer of vulcanizable rubber, the latter layer filling depressions in the former.

4. Composite material comprising a layer of smoked crepe rubber, and a layer of vulcanizable rubber which have been pressed into intimate adhesion.

5. Composite material comprising a layer of smoked crepe rubber and a layer of vulcanizable rubber which have been pressed together while the latter was in a highly plastic condtion.

6. Composite material comprising a layer of smoked crepe rubber, and a layer of vulcanized rubber secured together by pressing the latter layer, while in a plastic condition, against the former and vulcanizing the layers together.

7. The process for making composite material which comprises pressing a layer of plastic rubber onto a layer of smoked crepe rubber. —

8. The process for making composite materials which comprises pressing a layer of plastic, vulcanizable rubber onto a layer of smoked sheet rubber and vulcanizing the layers together.

9. The process for making composite materials which comprises calendering together a layer of hot plastic rubber, and a layer of smoked crepe rubber.

10. The process for making composite materials which comprises calendering together a layer of hot plastic, vulcanizable rubber, and a layer of smoked crepe rubber, and vulcanizing the layers together.

MAHLON P. WHIPPLE.